US012005719B2

(12) United States Patent
Bolumar Barrera et al.

(10) Patent No.: US 12,005,719 B2
(45) Date of Patent: Jun. 11, 2024

(54) PRINTING SYSTEM

(71) Applicant: HEWLETT-PACKARD DEVELOPMENT COMPANY, L.P., Spring, TX (US)

(72) Inventors: Gemma Bolumar Barrera, Sant Cugat del Valles (ES); Cintia Perez Gutierrez, Sant Cugat del Valles (ES); Alfonso Cameno Salinas, Sant Cugat del Valles (ES)

(73) Assignee: HEWLETT-PACKARD DEVELOPMENT COMPANY, L.P.

( * ) Notice: Subject to any disclaimer, the term of this patent is extended or adjusted under 35 U.S.C. 154(b) by 324 days.

(21) Appl. No.: 17/513,369

(22) Filed: Oct. 28, 2021

(65) Prior Publication Data

US 2023/0133937 A1 May 4, 2023

(51) Int. Cl.
*B41J 25/00* (2006.01)

(52) U.S. Cl.
CPC .................................. *B41J 25/006* (2013.01)

(58) Field of Classification Search
CPC ..... G03G 15/6502; B41J 19/00; B41J 25/001; B41J 25/304; B41J 25/308; B41J 25/3082; B41J 25/006; B41J 25/316; B65G 1/0414; B26D 1/60
See application file for complete search history.

(56) References Cited

U.S. PATENT DOCUMENTS

| | | | | | |
|---|---|---|---|---|---|
| 3,859,003 | A * | 1/1975 | Schulz | B23Q 1/40 409/281 |
| 5,388,919 | A * | 2/1995 | Kimura | B41J 25/316 400/354 |
| 5,562,062 | A * | 10/1996 | Upmeyer | B63B 25/22 114/72 |
| 5,815,171 | A | 9/1998 | Brugue | |
| 6,648,508 | B1 * | 11/2003 | Brunk | F16C 29/045 384/57 |
| 7,434,901 | B2 * | 10/2008 | Koh | B41J 2/1752 347/101 |
| 2003/0039499 | A1 * | 2/2003 | Kelley | B41J 25/308 400/59 |
| 2005/0002714 | A1 * | 1/2005 | Tsuji | B41J 23/025 400/59 |
| 2005/0062798 | A1 * | 3/2005 | Kerr | B41J 19/20 347/20 |
| 2005/0169808 | A1 * | 8/2005 | Pinkel | B41J 2/005 422/504 |
| 2011/0314469 | A1 | 12/2011 | Qian et al. | |
| 2012/0019592 | A1 | 1/2012 | Yuan | |
| 2013/0269178 | A1 | 10/2013 | Yuan | |
| 2014/0049589 | A1 * | 2/2014 | Moriya | B41J 25/304 347/104 |
| 2018/0274332 | A1 * | 9/2018 | Munro | B63G 8/001 |
| 2020/0271160 | A1 * | 8/2020 | Ruiz | F16C 17/22 |

* cited by examiner

*Primary Examiner* — John Zimmermann
(74) *Attorney, Agent, or Firm* — Shook, Hardy & Bacon L.L.P.

(57) ABSTRACT

In certain examples, a printing system comprises: a carriage guide extending in a longitudinal direction; a printer carriage movable, in use, along the guide; and at least one bearing to direct motion of the carriage along the carriage guide. The at least one bearing is movable, relative to the carriage guide and laterally to the longitudinal direction, from a first carriage guide contact position to a second carriage guide contact position.

13 Claims, 8 Drawing Sheets

PRINTING SYSTEM

BACKGROUND

Certain printing systems utilize one or more print carriages that carry elements such as print heads that can deliver substances to a printing area of the printing system. So that such elements have access to the printing area, the print carriage is arranged to transverse the printing area. The print carriage can be guided along the desired path by a guide such as a rod.

In three-dimensional (3D) printing systems, a print carriage may be deployed to deposit layers of build material onto the printing area and/or deposit certain printing agents, such as a fusing agent in the form of an image representing a portion of layer to be solidified.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
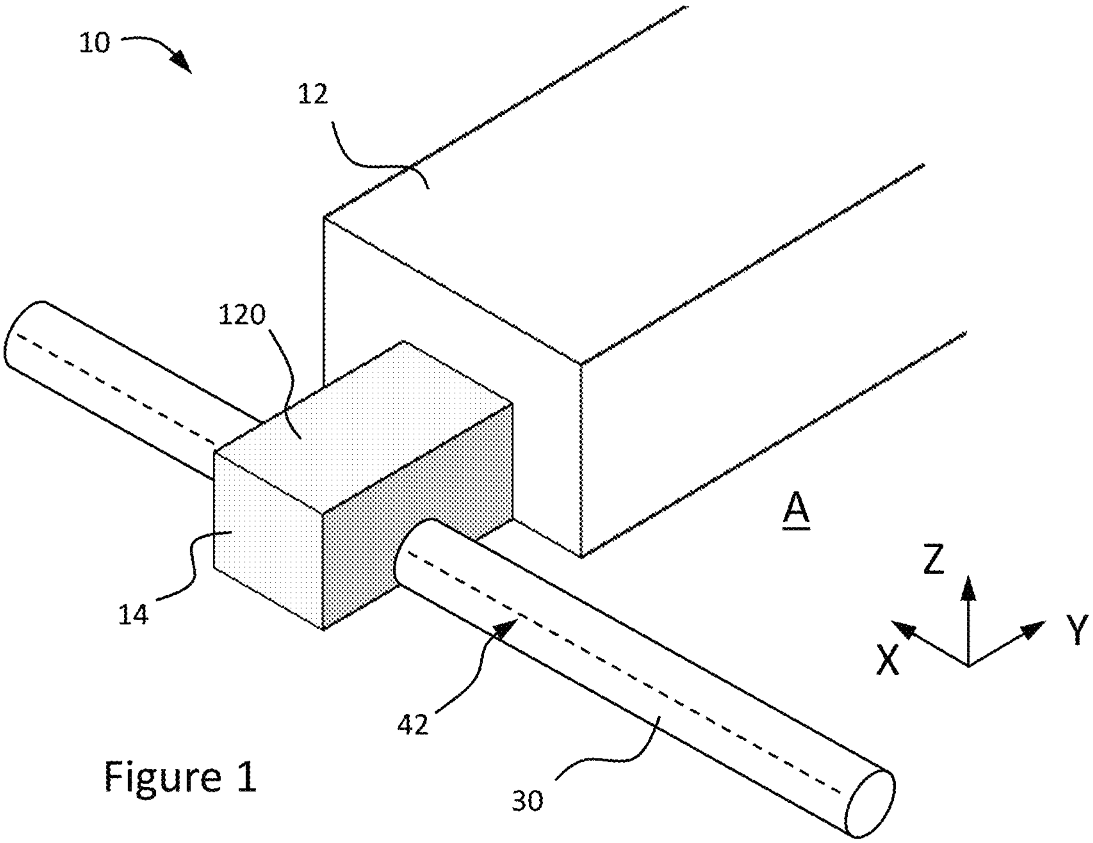
FIG. 1 is a schematic diagram of an example printing system comprising a carriage, a bearing housing, and a carriage guide.

One example of a printing system 10 employing a printer carriage 12 is shown in FIG. 1. The carriage guide 30 extends in a longitudinal direction. In some examples, the carriage guide 30 extends in in a substantially straight line. The printing system 10 includes a carriage guide 30. The printer carriage 12 is selectively movable along the carriage guide 30. That is the printer carriage can be moved to any chosen position along the carriage guide 30. The carriage guide 30 directs the motion of the printer carriage 12. In certain examples, the carriage guide 30 acts to support the printer carriage 12. The printer carriage 12 carries elements that can perform a printing function. For instance, print agent depositing print heads may be located in the printer carriage 12.

In the example shown in FIG. 1, the carriage guide 30 is linearly straight and directs the motion of the printer carriage 12 in an X-direction so that the printer carriage 12 is translatable across a print area A that extends in the X-direction. Hence, in this example, the longitudinal direction of the carriage guide 30 is substantially aligned with the X-direction. The printer carriage 12 is movable in a back and forth motion along the carriage guide 30. The print area A also extends in a Y-direction. The printer carriage 12 may extend in the Y-direction to cover the full extent of the print area A.

The print area A may provide space for print media to be located so that the elements located in the printer carriage 12, such as print heads, can deposit print agents upon the print media, in use.

In examples where the printing system is a three-dimensional (3D) printing system, the print area A extends in a Z-direction. For example, the print area A may be defined by a build platform that is movable in the Z-direction so that successive layers of a build material may be deposited in the print area A. The print area A may also be referred to as a print bed or a build area. The build material may be a powder comprising metal or other material. Each layer may have print agents, for example a fusing agent or a binding agent, applied from the printer carriage 12 selectively passing along the carriage guide 30. The printer carriage 12 may deploy other functionality when translating over the print area A such as applying heat or infrared radiation to fuse portions of build material or evaporate liquid components of the applied agents. The printer carriage 12 may also function to deposit a new layer of build material into the print area A. Each of these functions may be performed by the printer carriage 12 or additional carriages may be provided that perform specific functions.

Figure 2:
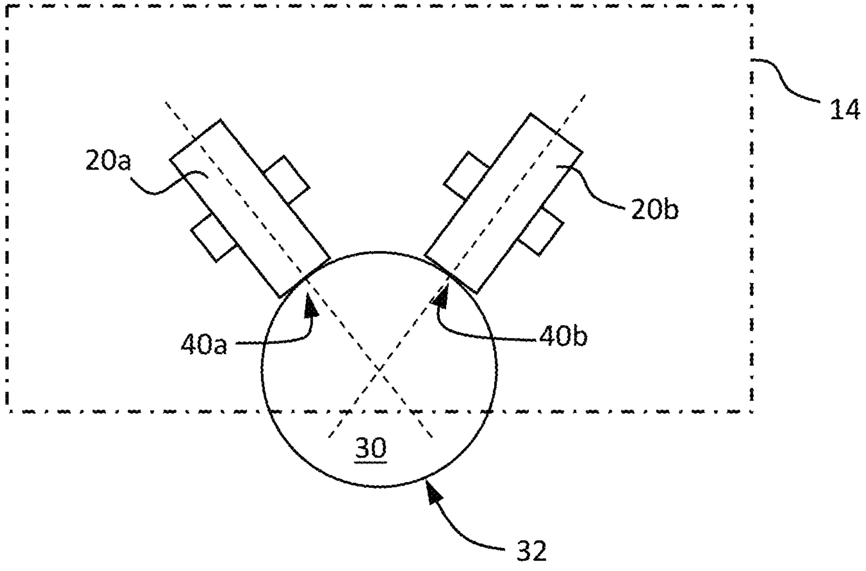
FIG. 2 is a cross-section through the bearing housing and carriage guide of FIG. 1.

The printing system 10 comprises at least one bearing. The at least one bearing is to direct motion of the carriage along the carriage guide 30. In certain examples, the printing system 10 comprises a single bearing. In other examples, more than one bearing is provided. For example, a single friction bearing or pad may be provided to slide along the carriage guide 30. In other examples, one or more friction pads may be provided. In certain examples, one or more roller bearings may be provided. FIG. 2, which is a schematic diagram of a cross-section in a Y-Z plane through the printing system 10 of FIG. 1, is another example of more than one bearing being used. In the example shown, the printing system 10 comprises two bearings 20*a*, 20*b*. The bearings 20*a*, 20*b* each comprise roller bearings that roll along the surface of the carriage guide 30. Other bearing types may be used.

In the example shown in FIG. 2, the bearings 20*a*, 20*b* are retained in a separate bearing housing 14, although the bearings 20*a*, 20*b* could instead be housed in the bulk of the carriage 12. The bearing housing 14 may be described as a bearing module and may contain any suitable number of bearings, such as the pair of roller bearings illustrate din FIG. 2. The bearing housing 14 may be connected to the printer carriage 12 or to a carriage support that connects the bearing housing 14 to the printer carriage 12. In some examples, the printer carriage 12 is to be supported on the bearings 20*a*, 20*b* in addition to being directed along the carriage guide 30 by the bearings 20*a*, 20*b*.

To guide and direct the motion of the printer carriage 12 along the carriage guide 30, in use, the at least one bearing contacts the carriage guide 30 at a contact position. The contact between the carriage guide 30 and the at least one bearing maintains the position of the printer carriage 12 relative to the carriage guide 30. The contact position is a point around a profile of the carriage guide 30 at which the at least one bearing contacts the carriage guide 30 at any one location along the length of the carriage guide 30. The profile of the carriage guide 30 is the outline, or boundary, of the carriage guide 30 formed on a plane passing through the carriage guide 30 and oriented substantially laterally, or in a transverse direction, to the longitudinal direction of the carriage guide 30. Thus, the plane is substantially perpendicular to the longitudinal direction of the carriage guide 30. Put another way, the contact position is the point along the perimeter, or boundary, of a cross-section through the carriage guide 30 where the at least one bearing contacts the carriage guide 30.

In certain examples, the carriage guide 30 has a fixed cross-sectional profile along the entire length of the carriage guide 30. This can help provide reliable positioning of the print carriage 12, for example in the X, Y, and Z-directions as shown in FIG. 2. In such examples, the contact position is at the same relative point around the carriage guide 30 profile for each location along the length of the carriage guide 30. In the example shown in FIGS. 1 and 2, the carriage guide 30 is straight and substantially aligned with the X-direction; hence, the two bearings 20*a*, 20*b* fix the position in the Y-direction and the Z-direction and allow for movement in the X-direction. The carriage guide 30 may comprise a metal, for example a carbon steel, which is easily machined. The metal may be plated to provide a higher surface hardness. For example, the carbon steel may be chrome plated.

In the example shown in FIGS. 1 and 2, the carriage guide 30 has a substantially circular profile 32 and thus comprises a cylindrical rod. The two bearings 20*a*, 20*b* contact the carriage guide 30 at contact positions 40*a*, 40*b*. Thus, in this instance, the contact position of the bearings 20*a*, 20*b* can be defined as located along the circumference of a cross-sectional circular profile of the carriage guide 30. It will be understood that other carriage guide shapes are possible.

Figure 3:
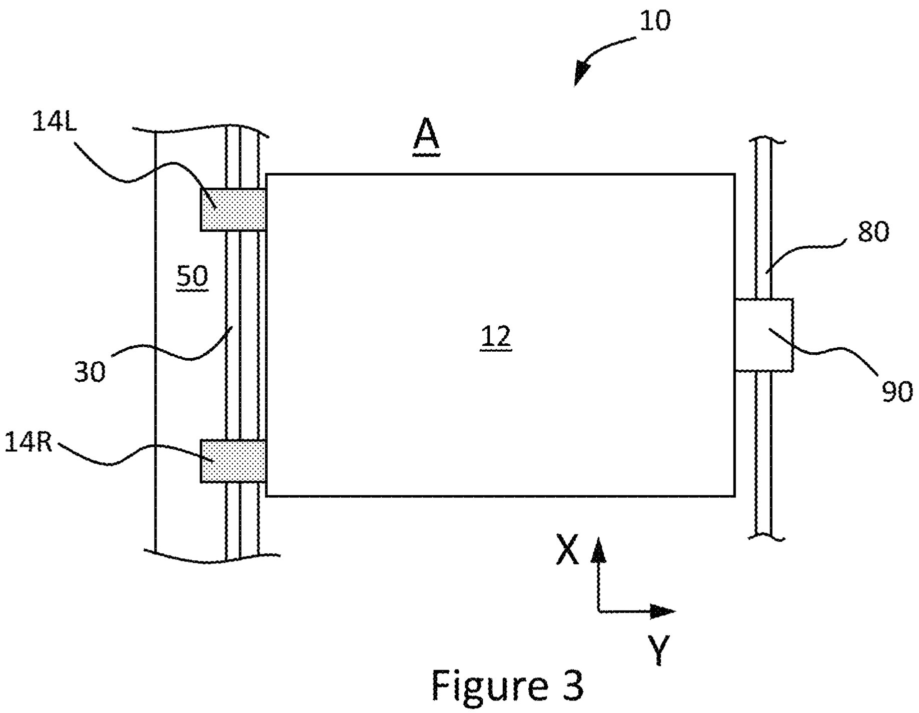
FIG. 3 is a is plan view of another example printing system comprising a carriage, bearing modules, and a carriage guide.
Figure 4:
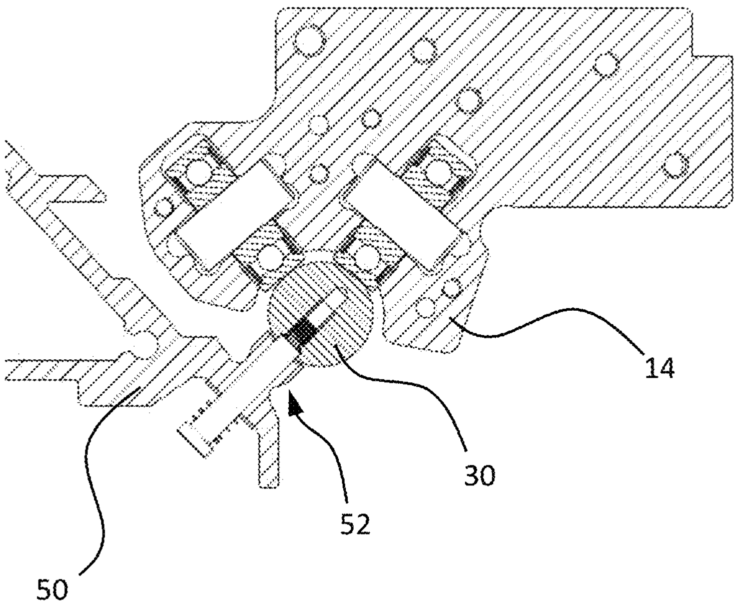
FIG. 4 is a cross-section through the bearing housing and carriage guide of FIG. 3.

FIGS. 3 and 4 further schematically illustrate an example printing system 10. In FIG. 3, the printer carriage 12 is relatively large, such as may be deployed in a 3D printing system in comparison with a 2D printing system, the printer carriage 12 is supported on a carriage guide 30 by left and right bearing modules 14L, 14R at a first end of the printer carriage 12, which may each comprise a bearing housing 14 as described above with respect to FIGS. 1 and 2. At a second end opposing the first end, the printer carriage 12 is carried on a third bearing module 90 that is in contact with a second carriage guide 80. The second carriage guide 80 may only act to support the printer carriage 12 and assist with positioning the printer carriage 12 in the Z-direction or may function in a similar manner to the any of the carriage guides 30 described herein. Detail of a second end of the printer carriage 12 has been excluded from FIG. 1.

In certain examples, the carriage guide 30 is mounted to a structure of the printing system 10 to provide suitable rigidity and therefore accurate printing from the elements carried on the printer carriage 12. For example, the carriage guide 30 may be mounted on a supporting beam 50 that runs substantially parallel to the carriage guide 30. Supporting beam 50 is located under carriage guide 30 in FIG. 3 and can be seen in a schematic cross-section through the bearing module 14R in FIG. 4. The beam 50 comprises a carriage support 52 on which the carriage guide 30 is mounted. The carriage support 52 may comprise a supporting rib that extends the length of the carriage guide 30 or may comprise a plurality of individual supports distributed along the length of the beam 50. The carriage support comprises a suitable surface to mate with the carriage guide 30. The carriage guide 30 is fixed to the supporting beam 50 using fasteners, in this case machine screws, distributed along the length of the carriage guide 30.

Movement of the printer carriage 12 along the carriage guide 30 traces out a bearing contact path 42, as shown in FIG. 1. The traced contact path 42 passes through each of the contact positions along the length of the carriage guide 30. As shown in FIG. 1, the contact path 42 may be substantially straight when the carriage guide 30 is substantially straight and has a fixed cross-sectional profile along the entire length of the carriage guide 30. Over the lifetime of a printing system 10, the printer carriage 12 will traverse backwards and forwards along the carriage guide 30 many thousands of times. The carriage guide 30 will therefore be subject to surface wear and degradation in a region in and around the contact path. Both the bearing(s) and the carriage guide 30 can be worn during the repetitive motion of the carriage 12, but, in certain examples, the carriage guide 30 tends to wear out faster because the surface of the carriage guide 30 is not as hard as the surface of the bearings(s). For instance, the wearing may progress to the extent that a substantially flat surface is formed along the contact path 42. In some examples, the carriage guide 30 may be plated, such as with a chrome plating, and the plating will be worn off the carriage guide 30 along the contact path 42. The wear or degradation may only involve the removal of microns of depth off the surface of the carriage guide 30 surface and still cause issues with the functioning of the printing system. For instance, plating on the carriage guide 30 may only be a few tens of microns thick and the service life of the carriage guide 30 may be considered over when that plating has been fully eroded along the contact path 42. Such wear can cause the useful service life of the carriage guide 30 to end because the positional accuracy of the printer carriage 12 can no longer be guaranteed due to the worn contact path. In particular, the Z-direction positional accuracy of the printer carriage 12 can be lost and this impacts the print quality delivered from the printer carriage 12; for instance, print head nozzles carried by the printer carriage can be undesirably closer to the print bed than intended thereby causing a degradation in print quality. The print heads themselves can also then suffer a shortened service life in such circumstances.

In certain printing systems, a carriage guide that has reached the end of its service life is difficult to replace without significant disassembly of many components of the printing system. For instance, a carriage guide is usually firmly attached to the supporting structure, such as the beam described above, and this structure often requires specific tooling and calibration processes that are normally only found in a factory setting. Accordingly, replacing a carriage guide is considered a difficult and expensive maintenance task.

The Applicant has also found that the shortening of the service life of a carriage guide due to the factors described above can be exacerbated in two-dimensional and three-dimensional printers that are deployed into industrial environments where such printers experience intensive and heavy use. In some three-dimensional printer applications, the printer carriages are comparatively large because such carriages may need to hold a large number of print heads and/or have additional sealing requirements to prevent ingestion of powdered build material into the carriage. In some applications, the removal of printing system components requires the use of a lifting crane before a carriage guide can be replaced.

Disclosed herein is a printing system comprising a carriage guide, a print carriage, and at least one bearing. The carriage guide extends in a longitudinal direction and the print carriage is selectively movable along the guide, in use. The at least one bearing is to direct motion of the print carriage along the carriage guide. The at least one bearing is movable from a first carriage guide contact position to a second carriage guide contact position. In moving the from the first carriage guide contact position to the second carriage guide contact position, the at least one bearing moves, relative to the carriage guide, laterally to the longitudinal direction of the carriage guide. The lateral movement is movement in a transverse direction to the longitudinal direction. In moving the at least one bearing, from the first carriage guide contact position to the second carriage guide contact position, and relative to the carriage guide is to relocate the at least one bearing laterally around the profile of the longitudinally extending carriage guide.

Moving the at least one bearing relative to the carriage guide in a lateral direction moves the contact position to a new contact position where the surface of the carriage guide is unworn and not degraded. Hence, performed as a maintenance procedure, this rearranging of the relative positions of the at least one bearing and the carriage guide allows the printing system to be returned to a substantially as new refurbished state, excepting any existing wear on the at least one bearing (which may also be replaced separately in some instances). In the case where this relative rearrangement is performed once, the service life of the carriage guide can be doubled. In some examples, the Applicant envisions that this procedure could be performed several times such that the at least one bearing is moved laterally relative to the carriage guide over service life periods to third or fourth positions—or more positions—thereby increasing the service life of the carriage guide by three or four times. The number of times that the procedure could be performed depends on the profile geometry of the carriage guide. The rearrangement procedure is also easier than a maintenance procedure where a new carriage guide is installed in the printing system thereby reducing the operating downtime during which the printing system is being maintained.

In certain examples, the carriage guide is moved relative to a supporting structure of the printing system on which the carriage guide is mounted whilst the at least one bearing remains in the same position relative to the carriage. In one example described further below, the carriage guide may be rotated to a new position on the support structure on which it is mounted thereby providing an unworn portion of the surface of the carriage guide as a new contact position for the at least one bearing.

In other examples, the at least one bearing may be moved relative to the printer carriage on which the bearing is mounted, such as in the bearing housing described herein, whilst the carriage guide remains fixed to the structure of the printing system on which it is mounted. For example, as described further below, a bearing housing holding the at least one bearing may be shifted to a different mounting location on a structure of the print carriage so that the at least one bearing runs on or contacts the surface of the carriage guide in a new contact position.

Moving the at least one bearing laterally to the longitudinal direction of the carriage guide involves moving the at least one bearing around the profile of the carriage guide so that a new point on the profile is where the at least one bearing contacts the carriage guide. Put another way, moving the at least one bearing laterally to the longitudinal direction of the carriage guide involves moving the at least one bearing along the perimeter of a cross-sectional area of the carriage guide so that a new point on the perimeter is where the at least one bearing contacts the carriage guide. Thus, where the carriage guide has a fixed cross-sectional profile along the entire length of the carriage guide, the new contact position is at the same relative point around the carriage guide profile for each location long the length of the carriage guide and, where the carriage guide is substantially straight, movement of the carriage along the carriage guide will trace out a substantially straight bearing contact path.

Figure 5:
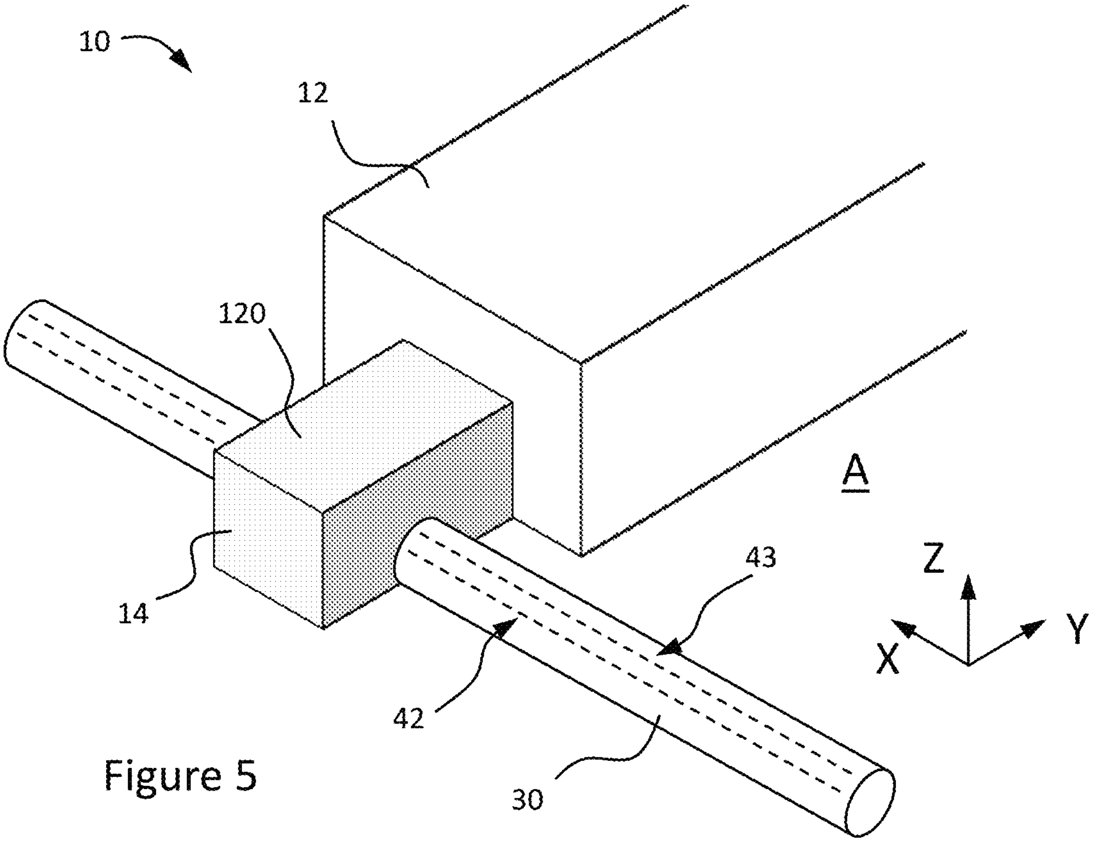
FIG. 5 is a is a schematic diagram of another example printing system comprising a carriage, a bearing housing, and a carriage guide.
Figure 6:
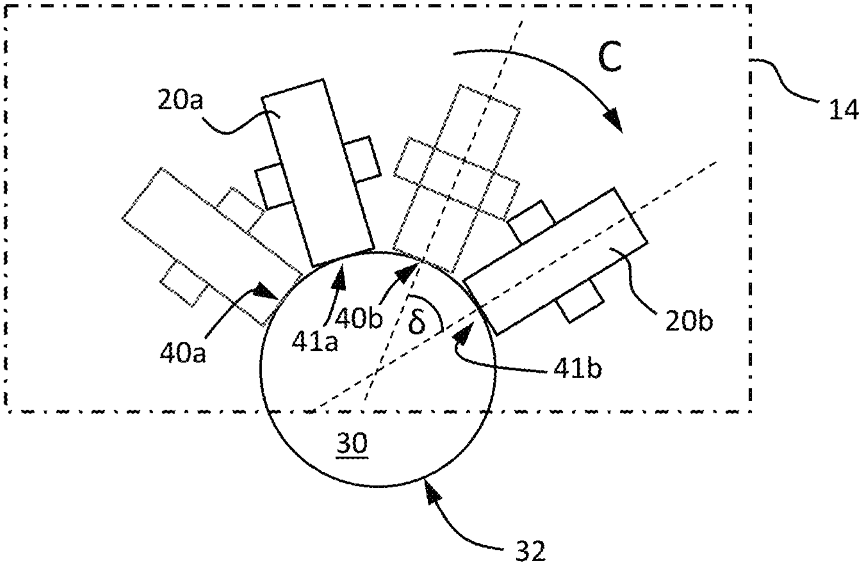
FIG. 6 is a cross-section through the bearing housing and carriage guide of FIG. 5.

FIGS. 5 and 6 illustrate an example of a printing system 10 comprising a carriage guide 30, a carriage 12, and two bearings 20*a*, 20*b*. It will be understood that any suitable number of bearings could be employed instead. As with FIGS. 1 and 2, FIGS. 5 and 6 illustrate the carriage guide 30 having a substantially circular profile 32, and thus comprising a cylindrical rod. The two bearings 20*a*, 20*b* contact the carriage guide 30 at first contact positions 40*a*, 40*b*. Movement of the printer carriage 12 along the carriage guide 30 traces out bearing contact paths, of which only the path 42 traced out by bearing 20*a* is shown in FIG. 5. As shown in FIG. 5, the contact paths 42 are substantially straight.

The bearings 20*a*, 20*b*, are movable, laterally to the longitudinal direction of the carriage guide 30, from the first contact positions 40*a*, 40*b* to second contact positions 41*a*, 41*b* where the bearings 20*a*, 20*b* each contact the carriage guide 30 in a new location. Moving the bearings 20*a*, 20*b* laterally to the longitudinal direction of the carriage guide 30 involves moving the bearings 20*a*, 20*b* around a profile 32 of the carriage guide 30 so that the bearings 20*a*, 20*b* contact the carriage guide 30 at new points on the profile 32.

In the example shown in FIGS. 5 and 6, the first contact positions 40*a*, 40*b* of the bearings 20*a*, 20*b* can be defined as the location along a circumference of the circular profile 32. Thus, in this example, moving the bearings 20*a*, 20*b* laterally to the longitudinal direction of the carriage guide 30 involves moving the bearings 20*a*, 20*b*, relative to the carriage guide 30, in a circumferential direction C of the carriage guide 30 from the first contact positions 40*a*, 40*b* to the second contact positions 41*a*, 41*b*. For example, the bearings 20*a*, 20*b* may be rotated by an angle δ, about an axis of the carriage guide 30, from the first contact positions 40*a*, 40*b* to the second contact positions 41*a*, 41*b*. Once the bearings 20*a*, 20*b* are arranged in the second contact positions 41*a*, 41*b*, movement of the printer carriage 12 along the carriage guide 30 traces out second bearing contact paths, of which, for the sake of clarity, only the path 43 traced out by bearing 20*a* is shown in FIG. 5.

The lateral movement of the bearings 20*a*, 20*b* relative the carriage guide 30 may be performed by moving the bearings 20*a*, 20*b* whilst the carriage guide 30 remains fixed in position on the structural support of the printing system 10 or performed by moving the carriage guide 30 whilst the bearings 20*a*, 20*b* remain fixed in position relative to the printer carriage 12. For example, the carriage guide 30 may be rotated by angle δ about an axis of the carriage guide 30 and fixed again to the supporting structure of the printing system 10 in the new location whilst the two bearings 20*a*, 20*b* remain in position relative to the carriage 12. Alternatively, the bearings 20*a*, 20*b* may be moved relative to the printer carriage 12 to which they are attached, in use, and rotated by angle δ about an axis of the carriage guide 30 and then fixed in a new position relative to the printer carriage

12 whilst the carriage guide 30 remains fixed to the supporting structure of the printing system 10.

In the arrangements described herein, the angle between the pair of bearings is designed to ensure no bearing will lose contact with the carriage guide during motion of the printer carriage along the carriage guide. Accordingly, when moving the at least one bearing laterally around the profile of a carriage guide in a printing system, it is important to consider the dynamic effects of a printer carriages carried on the carriage guide so that this functionality is not lost.

Figure 7:
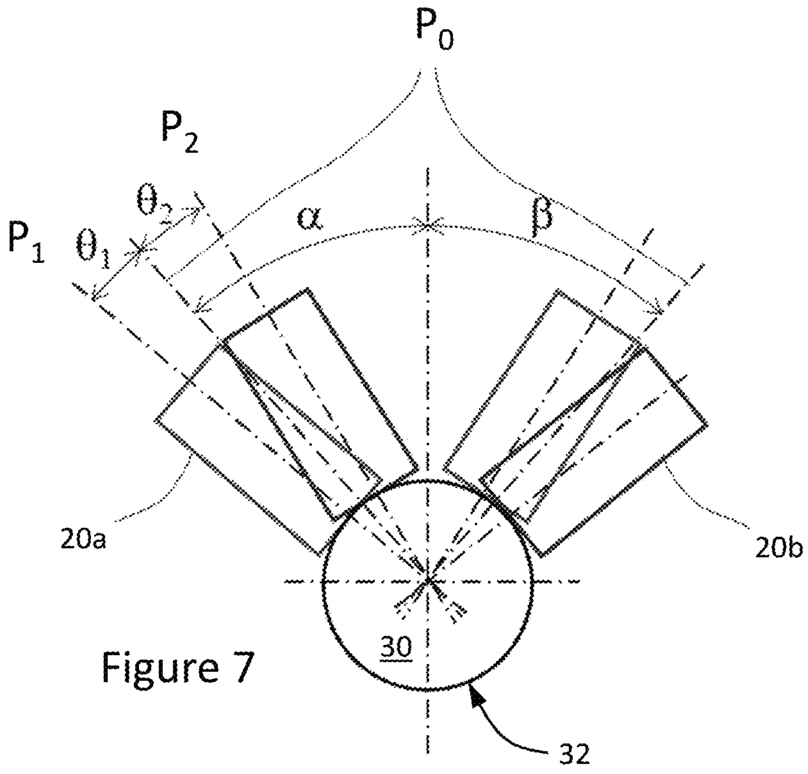
FIG. 7 is diagram illustrating an example of the angular positions of a pair of bearings, relative to a carriage guide.

FIG. 7 schematically illustrates an example of the angular positions of a pair of bearings 20*a*, 20*b*, such as those described herein, relative to a carriage guide 30. The angles $\alpha$ and $\beta$ show the angular position ($P_0$) of the bearings 20*a*, 20*b* if there is no requirement to account for moving the bearings 20*a*, 20*b* around the profile 32 of the carriage guide 30 to new guide contact positions. Angles $\alpha$ and $\beta$ may be equal or different sized angles. Angles $\theta_1$ and $\theta_2$ illustrate the angular offset from angular position $P_0$ respectively to angular position $P_1$ for the first contact position 40*a* and to angular position $P_2$ for the second contact position 41*a*. Angles $\theta_1$ and $\theta_2$ can be equal or different sized angles. Setting angles $\theta_1$ and $\theta_2$ at angular offsets can be arranged that do not compromise the dynamics of a printer carriage that is to be carried on the carriage guide 30. The desired angles $\theta_1$ and $\theta_2$ may depend on, for example, mass, acceleration rates, geometry, application point of impelling forces, and centre of gravity. For best performance, it is desirable that the bearings 20*a*, 20*b* are held in firmly in the desired angular positions during use.

Figure 8:
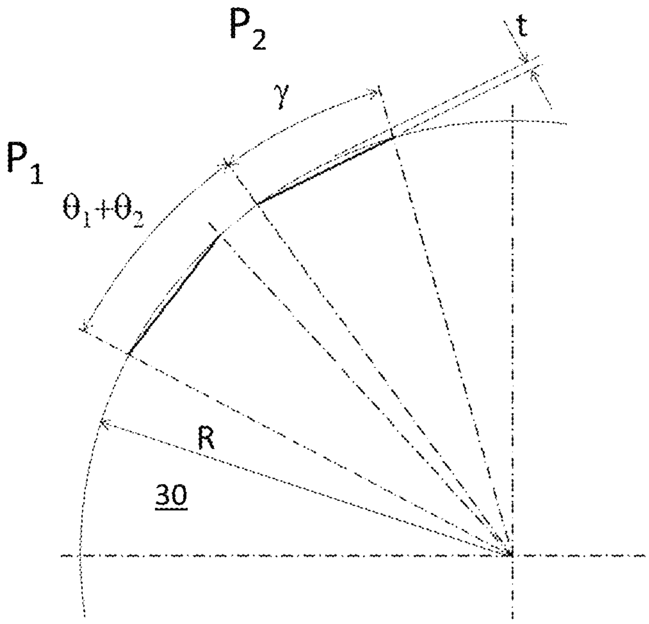
FIG. 8 is diagram illustrating an example of the angular distance between first and second guide contact positions.
Figure 9A:
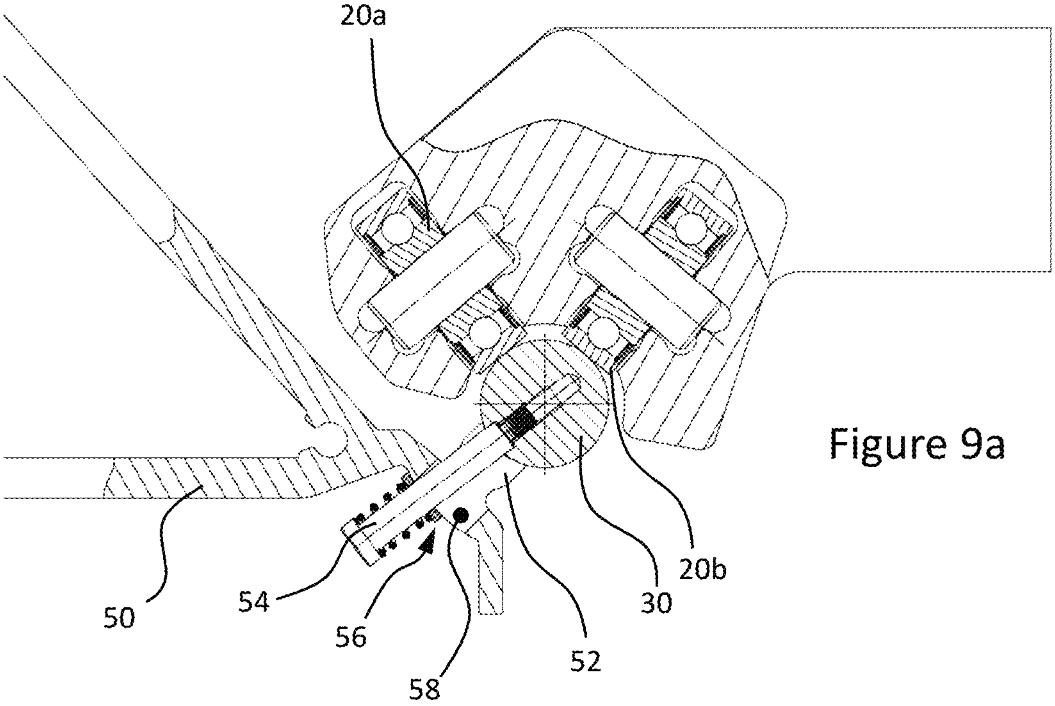
FIGS. 9*a*, 9*b*, 10*a*, and 10*b* illustrate an example of a printing system in which a carriage guide is movable relative to a supporting structure of the printing system.
Figure 9B:
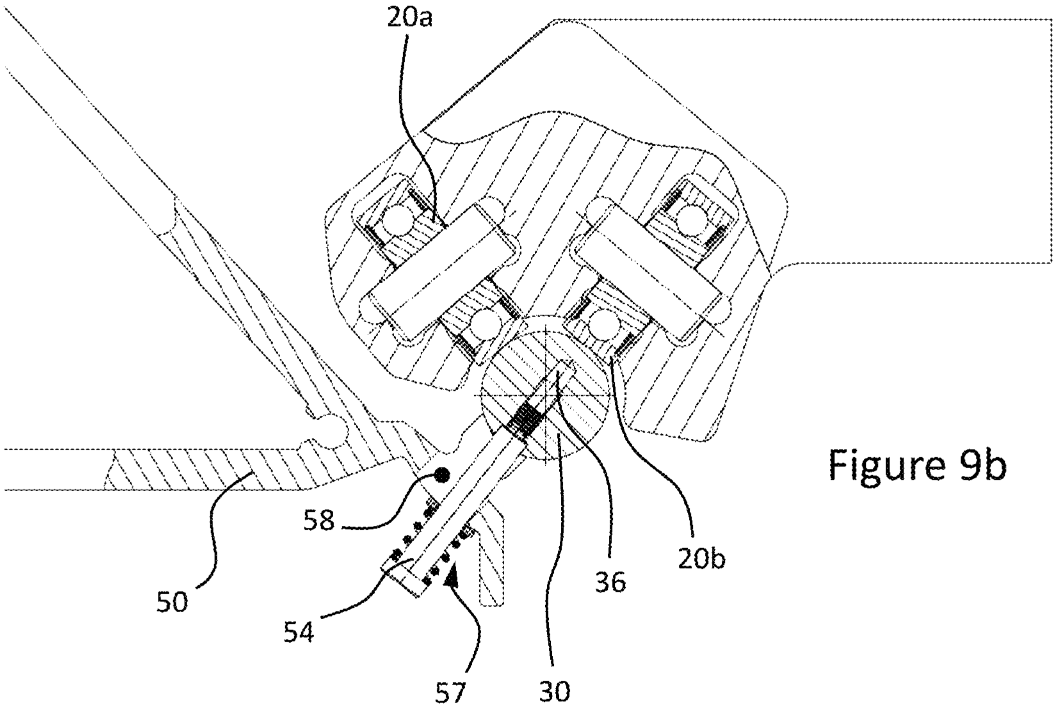

FIG. 8 schematically illustrates that, in certain examples where more than one bearing is present, it is desirable that the angular distance between position $P_1$ for the first contact position 40*a* and to angular position $P_2$ for the second contact position 41*a* are such that the worn portions of the carriage guide 30 surface at each of the first and second contact positions 40*a*, 41*a* are, at their maximum extent, sufficiently separated from each other. That is, the sufficient separation, measured angularly or linearly around the profile of the carriage guide 30, should be determined based on the condition of the carriage guide 30 surface when the first and second contact positions 40*a*, 41*a* are worn. For example, if the worn portion of the carriage guide 30 is removed thickness t from the radius R of the carriage guide 30, then angle $\gamma$ is the angular measurement of the worn portion at $P_2$ and the minimum angular amount $\theta_1+\theta_2$ that the bearings 20*a*, 20*b* be rotated from $P_1$ to $P_2$—to provide the necessary separation between the worn portions of the carriage guide 30—should be greater than angle $\gamma$.

FIGS. 9*a*, 9*b*, 10*a*, and 10*b* illustrate one example of a printing system 10 in which a carriage guide 30 is movable relative to a supporting structure of the printing system on which the carriage guide 30 is mounted whilst the at least one bearing remains in the same position relative to a printer carriage 30.

The printing system 10 comprises a longitudinally extending beam 50 on which the carriage guide 30 is mounted. The beam 50 may be an aluminum extrusion. In this example, the beam 50 comprises a carriage support 52 on which the carriage guide 30 is mounted. The carriage support 52 may comprise a supporting rib that extends the length of the carriage guide 30 or may comprise a plurality of individual supports distributed along the length of the beam 50. The carriage support comprises a suitable surface to mate with the carriage guide 30.

The printing system 10 comprises at least one fastener 54 to hold the carriage guide 30 to the beam 50. A plurality of fasteners may be distributed along the length of the carriage guide 30. In the example shown in FIGS. 9*a* and 9*b*, the one or more fasteners comprise a shaft 54 fixed to the carriage guide 30 where the, or each, fastener passes through a corresponding elongate slot 58 provided in the beam 50. The fastener is provided with a head that is larger than the slot 58 so that a force can be applied between the fastener and the beam 50 thereby retaining the carriage guide 30 on the beam 50 carriage support 52.

The elongate slot 58 permits the one or more fasteners to move with the carriage guide 30 as the carriage guide 30 is moved relative to the beam 50 from a first carriage guide contact position to a second carriage guide contact position. In the example shown in FIGS. 9*a* and 9*b*, the carriage guide 30 has a circular profile and carriage guide 30 and the fasteners rotate on the carriage support 52 to move from the first carriage guide contact position to the second carriage guide contact position. To aid the motion of the fastener along the slot 58, the fastener may comprise a low friction washer 56 that rests on the beam 50 around the slot 58. The washer may comprise PTFE, for example. To apply the force between the fastener and the beam 50, a biasing means 57 may located between the washer 56 and the underside of the fastener head. For example, the biasing means 57 may comprise a coil spring placed in compression between the fastener head and the washer 58. The biasing means allows the carriage guide 30 to be retained against the supports at both the first and second carriage guide contact positions, as well as during the transition between the guide contact positions, and permit rotational motion of the fastener and carriage guide 30. The fastener may comprise a cap screw, screw, bolt, or threaded rod and nut, for example. The one or more fasteners may each be mounted in a tapped blind hole 36 in the carriage guide 30.

Figure 10A:
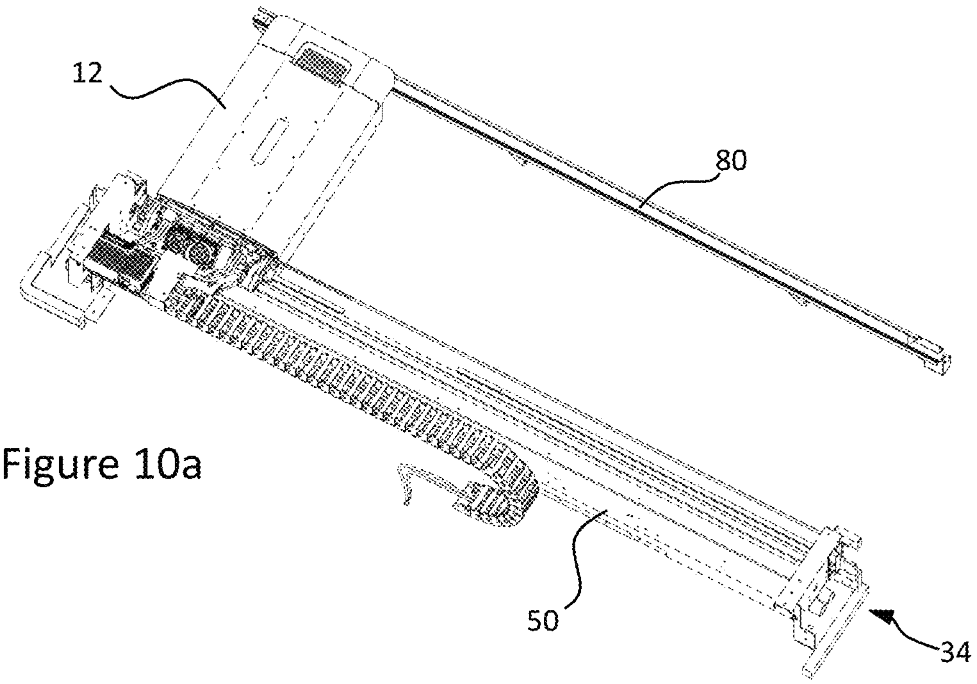
Figure 10B:
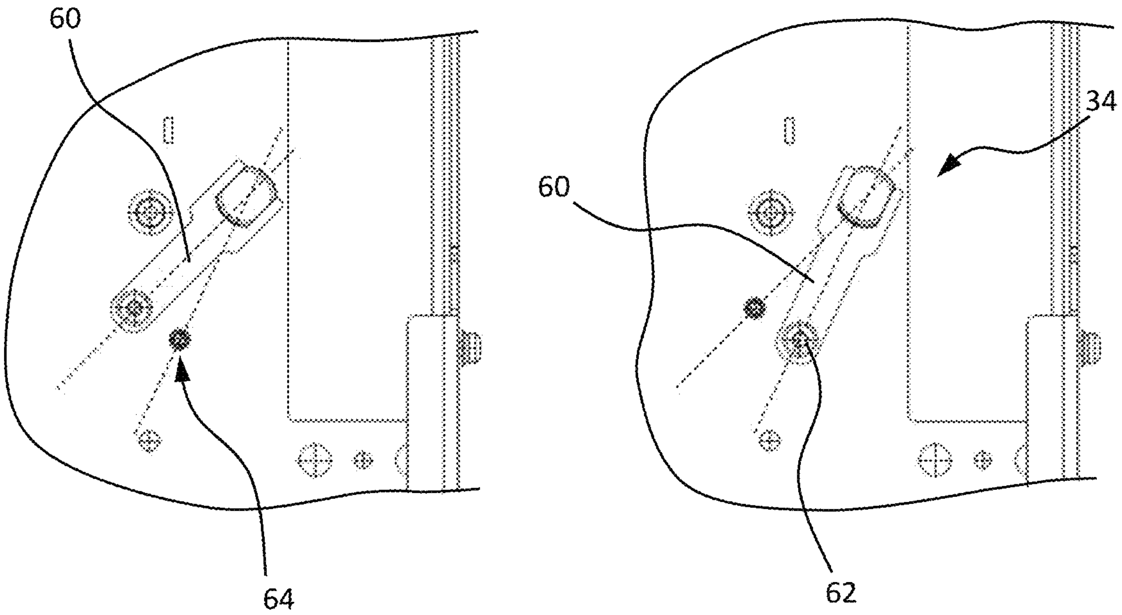

In certain examples, the carriage guide 30 is shaped at one or both ends to engage with a tool so that the tool can exert a torque on the carriage guide 30 and cause it to move from the first carriage guide contact position to the second carriage guide contact position. For instance, as shown in FIG. 10*b*, one end 34 of the carriage guide 30 has parallel flat faces to allow engagement with a positioning tool 60. The end 34 may be machined to a square or hexagonal form to engage with a corresponding positioning tool. In some examples, the positioning tool 60 can be locked in place to hold the carriage guide 30 in the selected guide contact position. For instance, at the opposing end of the positioning tool 60 from the carriage guide 30 engaging end, a screw 62 may be used to lock the positioning tool to a component of the supporting structure of the printing system 10. One or both ends of the carriage guide 30 may be shaped to engage with a corresponding positioning tool. The positioning tool 60 and, by extension, the carriage guide 30 may be rotatable manually by hand. The biasing means 57 can be set to exert enough force to retain the carriage guide 30 in place on the beam 50 yet allow manual rotation of the positioning tool 60. The provision of a positioning tool and a corresponding engagement portion on the carriage guide allows the carriage guide to be rotated without having to access the fasteners, which, in some printing systems, can only be accessed with difficulty from under the printing system 10 in a narrow space formed by the particular geometry of the supporting beam 50.

Figure 11A:
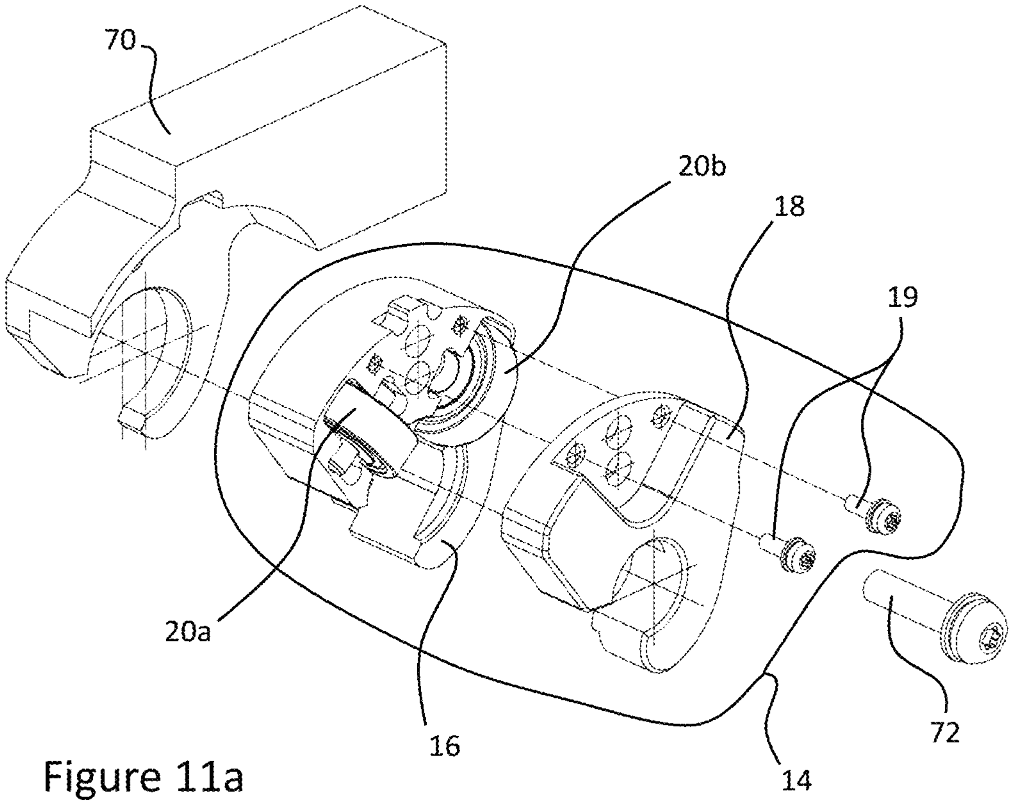
FIGS. 11*a* and 11*b* illustrate an example of a printing system in which at least one bearing is movable relative to a printer carriage.
Figure 11B:
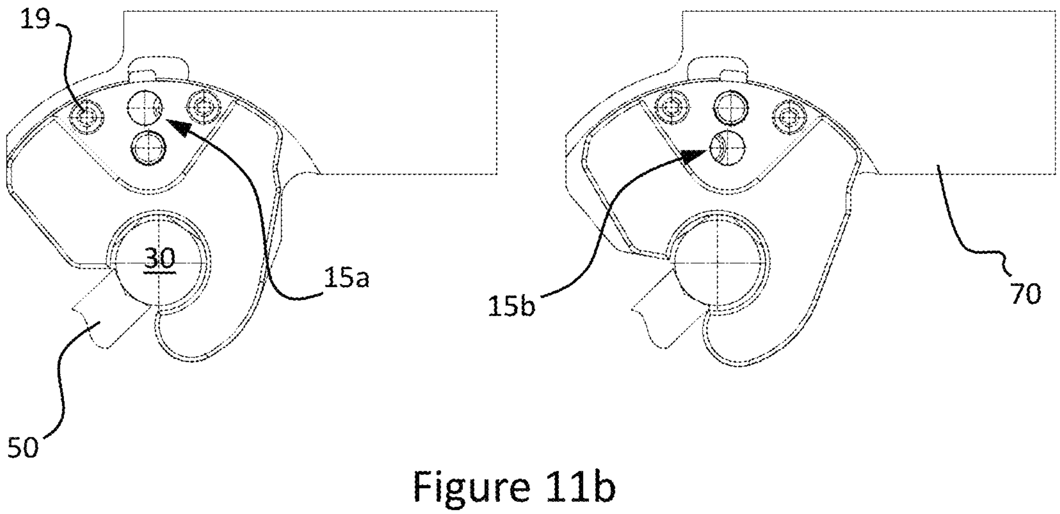

FIGS. 11*a* and 11*b* illustrate one example of a printing system 10 in which at least one bearing 20*a* is movable relative to a printer carriage on which the at least one bearing 20*a* is mounted whilst the carriage guide 30 remains fixed to the supporting structure of the printing system 10.

FIG. 11*a* shows an exploded perspective view of a bearing housing 14 that is mountable to a carriage support 70. The bearing housing 14 comprises a bearing receptacle 16 in which a pair of roller bearings 20*a*, 20*b* are held on respective shafts. A lid 18 is fixed with screws 19 to the bearing receptacle 16 to hold the bearings 20*a*, 20*b* in place.

Figure 12:
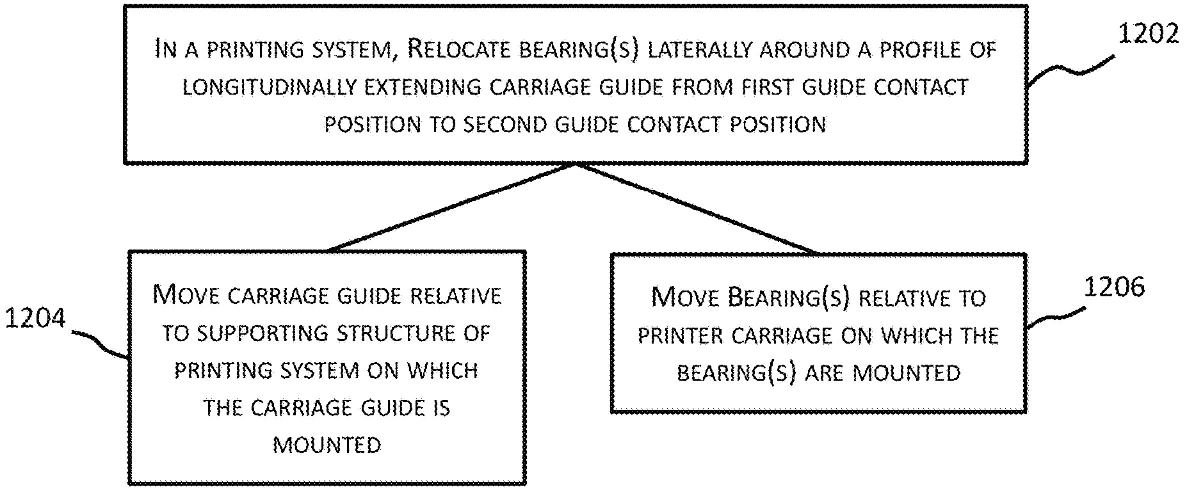
FIG. 12 is a flow chart of an example method of relocating at least one bearing laterally around the profile of a longitudinally extending carriage guide.

In the illustrated example, the bearing housing 14 is mountable to the carriage support 70 in more than one position. By repositioning the bearing housing 14 in the carriage support 70 the bearings 20*a*, 20*b* are movable from a first mounting position corresponding to a first carriage guide contact position to a second mounting position corresponding a second carriage guide contact position as described above. The bearings 20*a*, 20*b* may therefore be rotatable, in the bearing housing 14, about the carriage guide 30. FIG. 8 illustrates two possible mounting positions about the carriage guide 30, which is supported on a longitudinally extending beam 50 in a manner similar to the arrangement described above. FIG. 11*b* also illustrates alternate alignment/mounting holes 15*a*, 15*b* on the carriage support, which correspond to the first and second mounting positions, through which screw 72, shown in FIG. 11*a*, can be inserted to fix the bearing housing 14 in position on the carriage support 70. It will be understood that any suitable number of mounting positions may be provided—as permitted by the geometry of a carriage support, bearing housing, carriage guide, and other components—corresponding to respective carriage guide contact positions, and the With reference to FIG. 12, a method of relocating at least one bearing laterally of a longitudinally extending carriage guide to maintain a printing system will now be described. At block 1202, the method comprises relocating at least one bearing laterally around the profile of a longitudinally extending carriage guide from a first guide contact position to a second guide contact position. The at least one bearing is to direct motion of a printer carriage that is movable along the carriage guide.

In certain examples, at block 1204, the method, in relocating the at least one bearing, comprises moving the carriage guide relative to a support structure on which the carriage guide is mounted. In certain examples, the at least one bearing remains fixed relative to the carriage whilst the carriage guide is moved.

In certain examples, at block 1206, the method, in relocating the at least one bearing, comprises moving the at least one bearing relative to the printer carriage, wherein the at least one bearing is mounted to the printer carriage. In certain examples, the carriage guide remains fixed relative to a support structure on which the carriage guide is mounted whilst the at least one bearing is moved.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A printing system comprising:

a carriage support;

a carriage guide extending in a longitudinal direction, wherein the carriage guide is rotatable on the carriage support about an axis of the carriage guide;

a carriage that is movable, in use, along the carriage guide; and at least one bearing to direct movement of the carriage along the carriage guide;

wherein the at least one bearing is movable laterally to the longitudinal direction of the carriage guide, from a first carriage guide contact position to a second carriage guide contact position.

2. A printing system according to claim 1, wherein the carriage guide is rotatable on the carriage support to move the at least one bearing from the first carriage guide contact position to the second carriage guide contact position.

3. A printing system according to claim 2, wherein the at least one bearing is mounted on the carriage, and wherein the at least one bearing is moveable relative to the carriage to move the at least one bearing from the first carriage guide contact position to the second carriage guide contact position.

4. A printing system according to claim 1, wherein the at least one bearing is moveable around a profile of the carriage guide from the first carriage guide contact position to the second carriage guide contact position.

5. A printing system according to claim 4, wherein the carriage guide is substantially straight and has a substantially circular profile, and wherein the at least one bearing is movable in a circumferential direction of the carriage guide.

6. A printing system according to claim 5, wherein an angular distance between the first carriage guide contact position and the second carriage guide contact position is sufficient to separate worn portions of a surface of the carriage guide.

7. A printing system according to claim 1, wherein the at least one bearing is one of a pair of bearings retained in a bearing housing mountable to the carriage.

8. A printing system according to claim 7, wherein the bearing housing is relocatably mountable to the carriage in first and second mounting positions that respectively correspond to the first carriage guide contact position and the second carriage guide contact position.

9. A printing system according to claim 4, wherein the carriage guide is retained on the carriage support by one or more fasteners fixed into the carriage guide and rotatable with the carriage guide, and wherein the one or more fasteners are biased against the carriage support.

10. A printing system according to claim 9, wherein the printing system includes a longitudinally extending beam that comprises the carriage support, and wherein the longitudinally extending beam comprises one or more slots, each slot of the one or more slots is to receive and retain one of the one or more fasteners.

11. A printing system according to claim 4, wherein one end of the carriage guide is shaped to engage with a positioning tool, the positioning tool to exert a torque on, and cause rotation of, the carriage guide.

12. A method comprising:

relocating at least one bearing laterally around the profile of a longitudinally extending carriage guide from a first guide contact position to a second guide contact position, wherein the at least one bearing is to direct movement of a printer carriage that is movable along the carriage guide in a printing system; wherein relocating the at least one bearing comprises moving the carriage guide relative to a support structure on which the carriage guide is mounted.

13. The method of claim 12, wherein the at least one bearing is mounted to the printer carriage, and wherein relocating the at least one bearing comprises moving the at least one bearing relative to the printer carriage.

* * * * *